(12) United States Patent
Sexton (10) Patent No.: US 7,712,312 B2
(45) Date of Patent: May 11, 2010

(54) PRESSURE BALANCED SWING VALVE FOR ENGINE SYSTEM

(75) Inventor: Patrick Sexton, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 11/874,455

(22) Filed: Oct. 18, 2007

(65) Prior Publication Data

US 2009/0100834 A1    Apr. 23, 2009

(51) Int. Cl.
   *F02D 23/00*    (2006.01)
(52) U.S. Cl. .............. 60/602; 60/612; 137/601.11; 137/601.09; 137/601.15
(58) Field of Classification Search .......... 60/602, 60/612; 137/601.11, 601.09, 601.15
   See application file for complete search history.

(56) References Cited

U.S. PATENT DOCUMENTS

| | | | | |
|---|---|---|---|---|
| 2,672,237 | A | * | 3/1954 | Noble ................ 209/465 |
| 3,070,345 | A | * | 12/1962 | Knecht ................ 251/212 |
| 4,377,181 | A | * | 3/1983 | Chan ................ 137/601.05 |
| 4,658,857 | A | * | 4/1987 | Ayres, Jr. ............ 137/601.11 |
| 4,893,698 | A | * | 1/1990 | Suzuki .............. 137/601.05 |
| 5,102,097 | A | | 4/1992 | Davis et al. |
| 5,634,333 | A | | 6/1997 | Tanaka et al. |
| 5,765,592 | A | | 6/1998 | Karlicek |
| 6,557,826 | B2 | * | 5/2003 | Moore et al. ......... 137/601.11 |
| 6,976,359 | B2 | | 12/2005 | Hastings et al. |
| 2006/0021347 | A1 | | 2/2006 | Sun et al. |

* cited by examiner

*Primary Examiner*—Thomas E Denion
*Assistant Examiner*—Mary A Davis
(74) *Attorney, Agent, or Firm*—Allan J. Lippa; Alleman Hall McCoy Russell & Tuttle LLP (57) ABSTRACT

As one example, an apparatus configured to regulate flow in an exhaust passage of an internal combustion engine system is provided. The apparatus comprise a housing disposed within the exhaust passage defining a first region and a second region, where the first region includes a first stopper and a first valve plate, where first stopper completely surrounds first region, and the first valve plate seats on the first stopper to seal first region, and where the second region includes a second stopper and second valve plate, where second stopper completely surrounds the second region, and the second valve plate seats on the second stopper to seal second region, and where the first stopper; a translating mechanism coupled between first and second plates, the mechanism coupling the first and second plates through a set of gears in the housing, such that forces acting to close first plate are translated through mechanism to act to open the second plate, and vice versa; and an actuator to move the translating mechanism, where such movement causes both the first and second plates to rotate concurrently.

19 Claims, 5 Drawing Sheets

PRESSURE BALANCED SWING VALVE FOR ENGINE SYSTEM

BACKGROUND/SUMMARY

Valves are used in internal combustion engines to impede the flow of fluid down a passageway to control a turbocharger. A swing valve may be used in an engine exhaust because of its ability to effectively seal the exhaust passageway, allowing very little fluid to travel downstream of the valve. Swing valves require a very large amount of energy to operate because of their configuration in relation the direction of the flow.

One example of turbocharger control is described in U.S. Pat. No. 5,634,333. In this example it is recognized the need to properly seal an exhaust passage as efficiently as possible. A modified swing valve is used to seal the exhaust passage. The modification includes a spring mechanism and a diaphragm coupled to the valve plate through a series of shafts and pivots. The diaphragm is coupled to the intake manifold allowing the manifold pressure to exert a force on the diaphragm moving the spring and allowing the exhaust valve to be opened. This allows the engine to operate more efficiently because of the use of intake pressure rather than electricity to drive the valve actuator.

Another approach to controlling flow in the exhaust may be a butterfly valve. The butterfly valve requires much less actuation force to open the valve. Unfortunately the butterfly valve ineffectively seals the passageway because of its inability to seat the rotating plate which blocks the flow of fluid in the passage.

The inventor herein has recognized several problems with each of the above approaches. First the modified swing valve may not open under a variety of engine conditions. For example if the manifold pressure is too low the modified swing valve cannot be opened. The use of the intake air pressure to drive the actuator in the modified swing valve reduces pressure which the engine can effectively deliver to the cylinders in the engine reducing the engine speed. The system of pipes used to drive the actuator in the modified swing valve would increase the size and cost of the engine with the addition of extra parts. Finally the butterfly valve may not require a very large actuation force to open, however it may not effectively seal the passageway allowing a great deal of fluid to travel downstream past the valve when it is in a closed position.

In one embodiment, the above issues may be addressed by utilizing a pressure balanced swing valve in an exhaust passage which is used to decrease the amount of power which is needed to operate the swing valve allowing the turbocharger system to work more efficiently, while maintaining an effective seal in the passageway when the valve is in a closed position. This is done through translation of the force which is applied on the valve by the fluid into opposing forces through a simple gearing system. In this way, an efficient usage of flow area may be obtained, and further the approach may be applied to various pipe shapes, including a round pipe. Additionally, in one example, forces may be translated via an internal gear mechanism, thereby providing a compact design.

DETAIL SPECIFICATION

Figure 1:
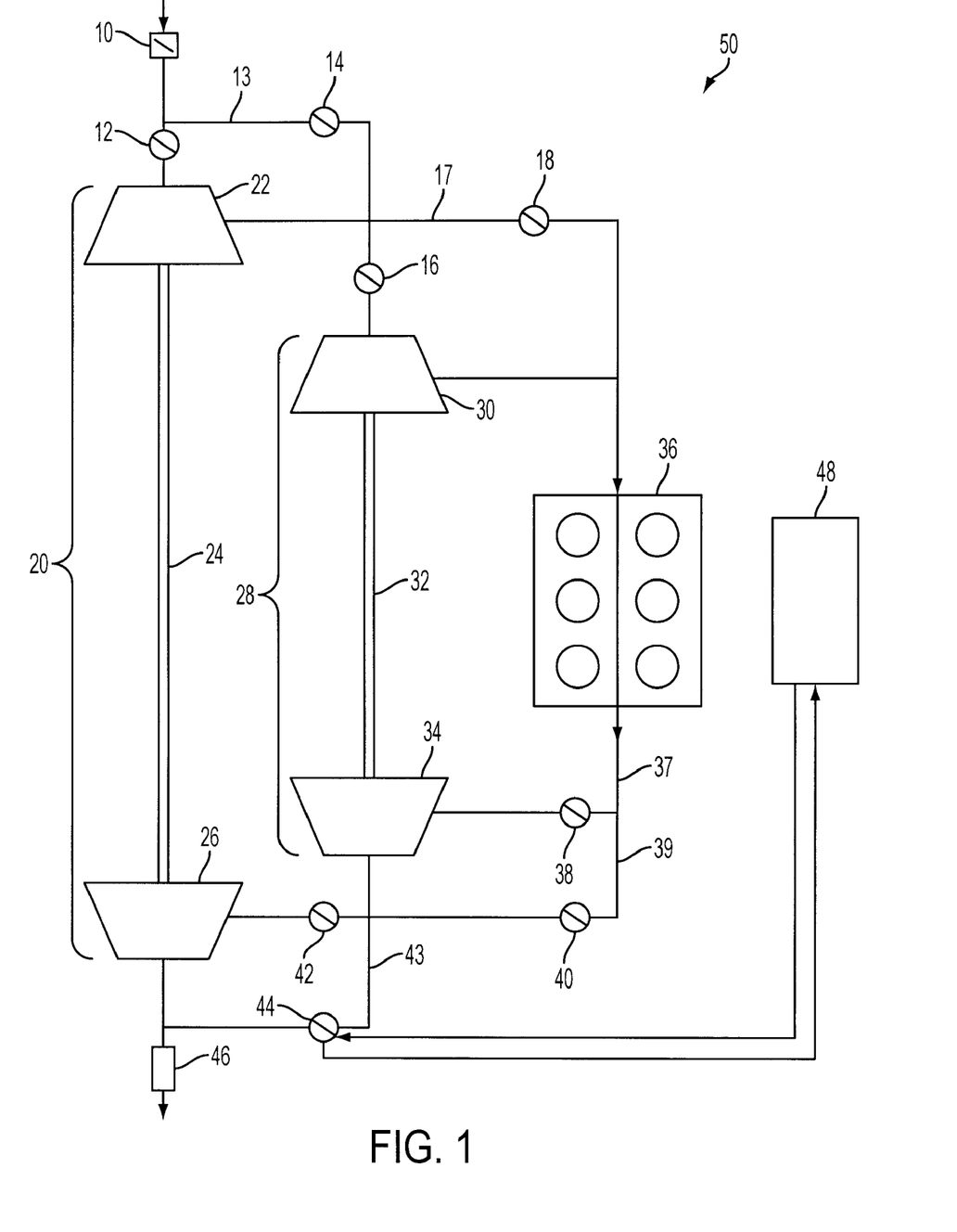
FIG. 1 shows a schematic depiction a series sequential turbocharger system with a pressure balanced swing valve.

FIG. 1 shows of a schematic depiction of an engine system 50 including a series sequential pair of turbochargers and an internal combustion engine 36. The pair of series sequential turbochargers can include a larger volume turbocharger 20 and smaller volume turbocharger 28. The larger volume turbocharger may include a larger volume compressor 22 coupled to a larger volume turbine 26 through an axle 24. The smaller volume turbocharger may include a smaller volume compressor 30 coupled to a smaller volume turbine 34 though an axle 32. Turbochargers 20 and 28 may be used individually or in combination to provide a prescribed level of boost across a wider range of operating conditions. Compressor bypass passages, 13 and 17 may be provided to enable intake air to bypass compressors 22 and 30, respectively. A compressor bypass valve 14 may be provided along compressor bypass passage 13 and a compressor bypass valve 18 may be provided along compressor bypass passage 17 to control the amount of intake air bypassing each of the compressors.

In addition to or as an alternative to the compressor bypass passages and associated compressor bypass valves, compressor intake valves 12 and 16 may be provided to further regulate the amount of intake air that is provided to compressors 22 and 30, respectively. The compressor bypass valves and/or compressor intake valves can be swing valves, throttle valves, or pressure balanced swing valves. A schematic depiction of an example pressure balanced swing valve that may be used as one of valves 12, 14, 16, or 18 is described in greater detail with reference to FIGS. 2a-2c.

An intake throttle 10 may be located upstream of the compressors and compressor bypass valves to further regulate the amount of intake air which the engine receives. Alternatively, or additionally, an intake throttle may be provided downstream of an outlet of compressor 30. An engine exhaust passage 37 located downstream of multi-cylinder internal combustion engine 36 provides exhaust gas to turbine 34 and/or turbine 26, which are connected in series in this example. Bypass passages 39 and 43 may be provided for turbines 34 and 26 respectively. Bypass passages 39 and 43 can include bypass valves 40 and 44, respectively. Bypass valves 40 and 44 can be controlled by electronic controller 48 to vary the amount of exhaust gases redirected around one or both of the turbines. Note that while controller 48 has been shown communicating with valve 44, controller 48 can also communicate with each of the valves described herein. For example, controller 48 can receive an input from each of the valves indicative of valve position and can provide a valve control signal to the actuator associated with each of the valves to vary the valve position. Turbine intake valves 38 and 42 may be positioned upstream of the turbines 34 and 26, respectively, to further regulate the amount of exhaust gases which the turbines receive. The turbine bypass valves and/or turbine intake valves can be swing valves, throttle valves, or pressure balanced swing valves. Thus, the position of the various valves can be adjusted during engine operation based on the selected engine operating mode and operating conditions, as discussed in more detail herein with reference to FIG. 3. A schematic depiction of an example pressure balanced swing valve that may be used as one of valves 38, 40, 42, or 44 is described in greater detail with reference to FIGS. 2a-2c.

Downstream of the outlet of the larger volume turbine 26, an after treatment device 46 may be provided. The after treatment device may include a catalyst, a filter, a trap, or other suitable exhaust after treatment device.

A control system 48 may be provided including a controller 48 for identifying operating conditions of the engine system and adjusting and/or monitoring one or more of the following components: the position of the intake throttle valve 10, the position of the compressor bypass valves 14 and 18, the position of the compressor intake valves 12 and 16, the position of the turbine bypass valves 40 and 44, the position of the turbine valves 38 and 42, crank angle sensors of engine 36, engine speed, timing and quantity of fuel injected in to the cylinders of the engine, and temperature of the engine, among other engine parameters described herein.

Figure 2A:
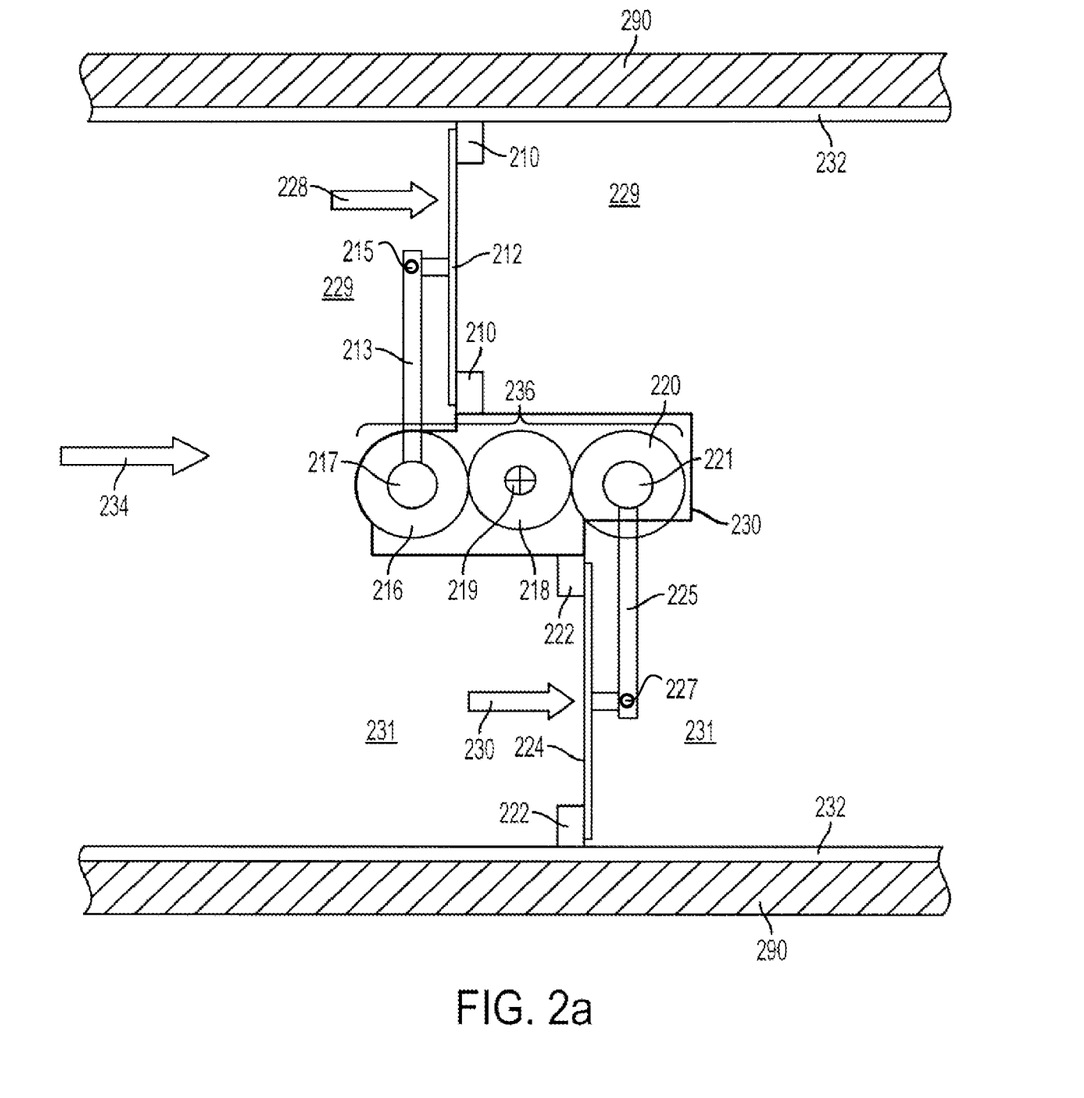
FIG. 2a shows a schematic depiction of an example pressure balanced swing valve in a closed position.
Figure 2B:
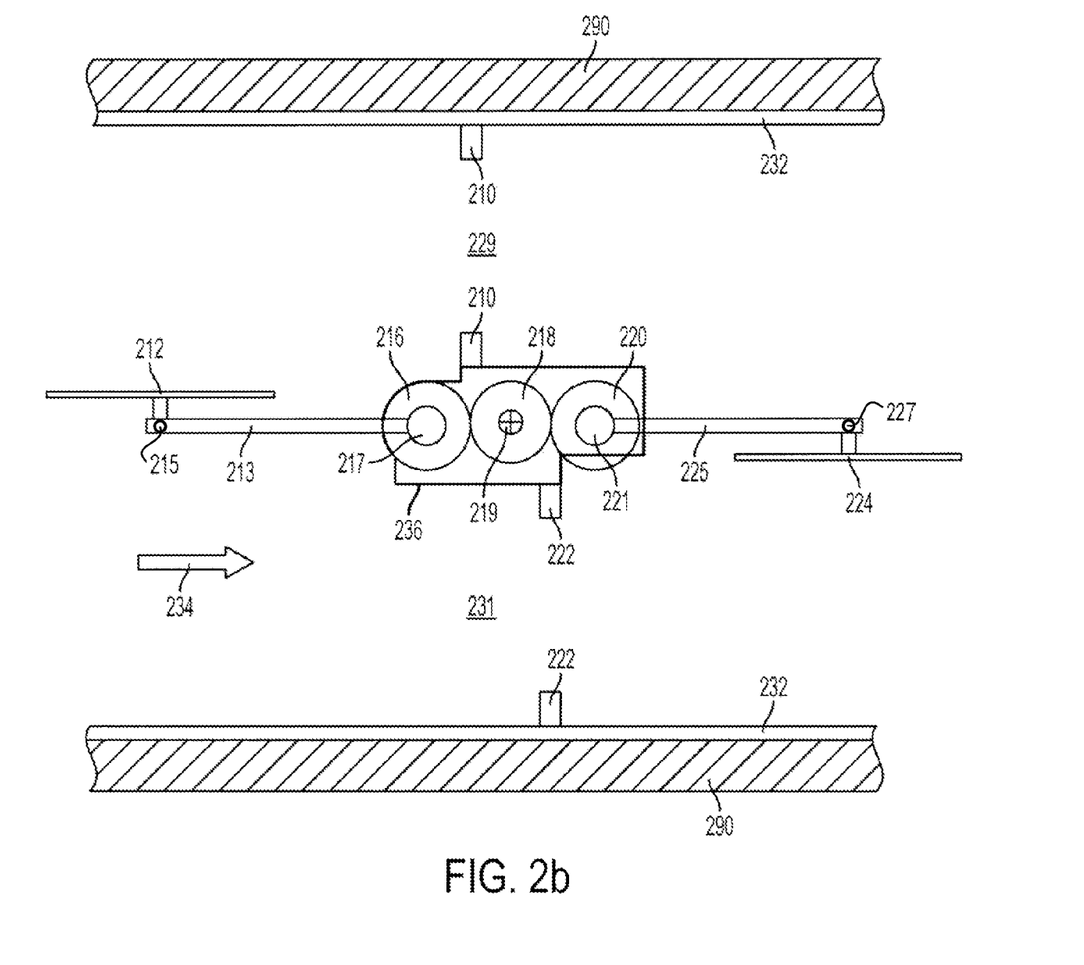
FIG. 2b shows a schematic depiction of the example pressure balanced swing valve in an opened position.
Figure 2C:
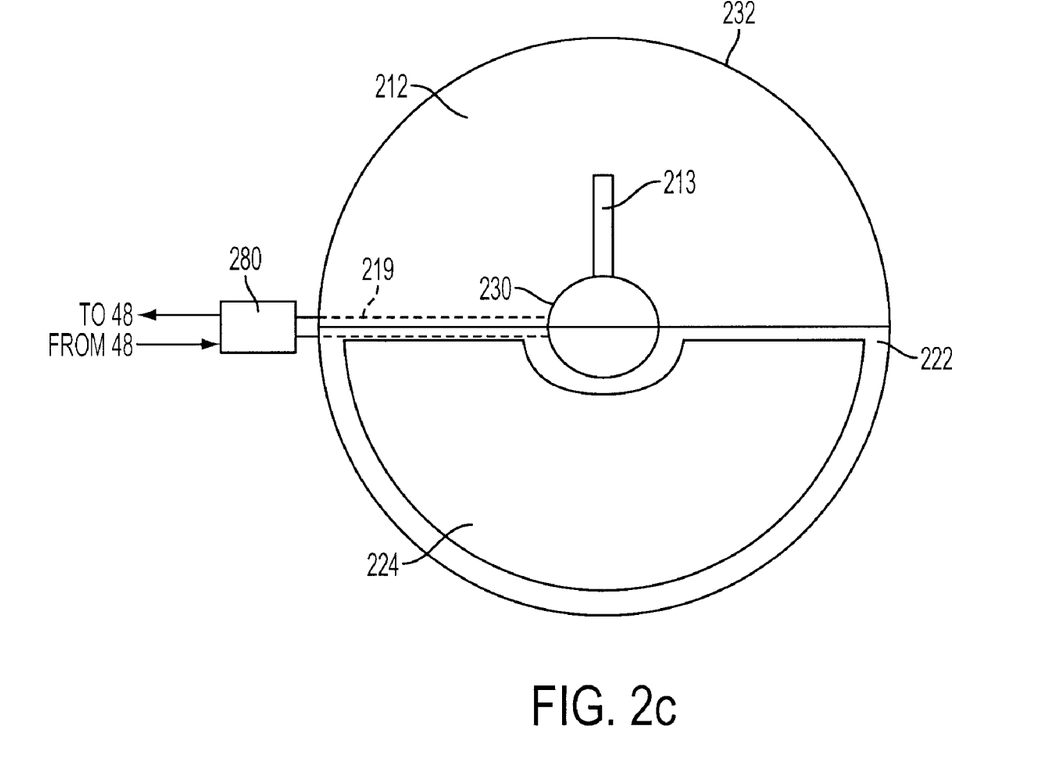
FIG. 2c shows an additional view of the example pressure balanced swing valve of FIGS. 2a and 2b.

Referring now to FIGS. 2a, 2b, and 2c, an example pressure balanced swing valve is described, which may be used as one or more of valves 12, 14, 16, 18, 38, 40, 42, and/or 44 shown in FIG. 1. However, it should be appreciated the pressure balanced swing valve described herein can be included in other engine system configurations that do not necessarily include a turbocharger.

FIG. 2a shows a schematic depiction of a side view of an example pressure balanced swing valve 200 in a fully closed position. As one example, the pressure balanced swing valve may be arranged along in an intake or exhaust passage indicated at 290 as shown in FIGS. 2a and 2b as a longitudinal section view of the passage.

In this particular example, the pressure balanced swing valve 200 is shown including a valve housing 232, which can be seated against the inner wall of passage 290. Valve 200 includes a translation device or mechanism 236 enclosed by a translation device hub or housing indicated generally at 230. A first valve plate 212 is moveably coupled to translation device 236 via a valve plate arm 213. A second valve plate 224 is moveably coupled to translation device 236 by a valve plate arm 225. The first and second plates may each be partially rounded, such as a substantially half-moon shape as indicated in the figures. For example, the valve plates may have a first, rounded edge that substantially matches a shape of the external passage 290, which in one example may be substantially round. The valve plates may also each have a second, substantially straight edge in an interior region of the valve, such as shown in FIG. 2C. Further still the second edge in the interior region may include additional cut-outs to enable mounting to the gears as shown in the figures. In this way, an efficient use of area may be obtained, while providing the pressure balanced valve operation.

In some examples, valve plate 212 may be moveably coupled to arm 213 via pivot connection 215 and valve plate 224 can be moveably coupled to arm 225 via a pivot connection 227. In this particular example, pivot connections 215 and 227 enable plates 212 and 224 to rotate with a single degree of freedom relative to their respective arms, however, it should be appreciated that in other examples, pivot connections 215 and 217 can be configured to enable plates 212 and 224 to rotate in multiple degrees of freedom relative to their respective arms. For example, pivot connections 215 and 227 can be configured as ball and socket joints. In this way, pivot connections 215 and 227 can allow better conformance of the valve plates with the mating surface of the stopper frames, thereby providing a better valve seal during the closed position shown in FIG. 2a.

Valve 200 includes a first flow region 229 defined by a first stopper frame 210. In the closed position shown in FIG. 2a, valve plate 212 can rest against stopper frame 210 to substantially reduce or inhibit airflow through flow region 229. Thus, in at least one example, stopper frame 210 defines a perimeter of the first flow region 229. Valve 200 also includes a second flow region 231 defined by a second stopper frame 222. In the closed position shown in FIG. 2a, valve plate 224 can rest against stopper frame 222 to substantially reduce or inhibit airflow through flow region 231. Thus, in at least one example, stopper frame 222 defines a perimeter of the first flow region 231. As one non-limiting example, the upper and lower valve plates have a semi-annular disk shape that may be complimented by their respective stopper frames as shown in FIG. 2c. However in other examples the relative size and/or shape of the valve plates may vary. For example, the stopper frames and/or valve plates may be of different shape to accommodate the specific geometry of the passage.

Valve arms 213 and 225 are shown coupled to translation device 236. Translation device 236 can be configured such that movement of valve plate 212 in a direction that corresponds to a reduction of fluid flow through flow region 229 (e.g. valve plate 212 moves towards stopper frame 210) results in a movement of valve plate 224 in a direction that also corresponds to a reduction in of fluid flow through flow region 231 (e.g. valve plate 224 moves towards stopper frame 222). Similarly, movement of valve plate 212 in a direction that corresponds to an increase in flow region 229 (e.g. valve plate 212 moves away from stopper frame 210) results in a movement of valve plate 224 in a direction that also corresponds to an increase in flow region 231 (e.g. valve plate 224 moves away from stopper frame 222). In this way, the pair of valve plates can also rotate in a common angular direction, which results in an opposite direction of translation of the valve plates relative to the direction of fluid flow indicated at 234. Note that in this particular example, valve plate 212 is located on an upstream side of stopper frame 210 and valve plate 224 is located on a downstream side of stopper frame 222. Thus, to close both of the flow regions, the valve plates 212 and 224 are seated on their respective stopper frame (e.g. via a right angle contact), substantially sealing the entirety of passage 290.

As one non-limiting example, translation device can provide the above functionality by way of a first shaft or bearing 219 including a first gear 218. Gear 218 can mate with gears 216 and 220 supported by shafts or bearings 217 and 221, respectively. Arm 213 can be fixedly coupled to shaft 217 and/or gear 216 such that rotation of shaft 217 and/or gear 216 results in rotation of arm 213 and vice-versa. Similarly, arm 225 can be fixedly coupled to shaft 221 and/or gear 220 such that rotation of shaft 221 and/or gear 220 results in rotation of arm 225 and vice-versa.

Shaft 219 can receive an input from a motor or actuator (e.g. shown in FIG. 2c) to cause rotation of gear 218 in either a clockwise or counter-clockwise direction, thereby causing a corresponding rotation of arms 213 and 225. Further, in some examples, translation device 210 and/or shaft 219 spans the middle of passage 290. For example, valve housing 232 can be fixedly coupled secured to housing 230 and/or translation mechanism 236 in at least two locations located on opposite sides of the passage as shown for example in FIG. 2c.

To open the pressure balanced swing valve from a closed position, the actuator rotates the driver gear (e.g. ear 219) clockwise, unseating and rotating the upper and lower valve plates in a counterclockwise direction (e.g. with regards to FIGS. 1a and 1b). When the valve is at rest in the closed position a force 228 is applied to the upper valve plate by the fluid, urging the upper valve plate closed, and creating a moment about the left driven gear which in turn applies a counterclockwise force to the driver gear 218. A force 230 is also applied to the lower valve plate by the fluid, urging the lower valve plate open, and creating a moment about the right driven gear which in turn applies a clockwise force to the driver gear 218. These opposing forces allow the actuator to apply lower actuation forces to open and close the valve in comparison to a non-balanced swing valve. The size and power of the actuator can also be reduced by the balancing of forces on the valve plates, thereby increasing actuator efficiency, without sacrificing flow sealing, even in the caustic environment of an engine exhaust.

The right driven gear (e.g. gear 220), the left driven gear (e.g. gear 216), and the driver gear (e.g. gear 218) may be enclosed by housing 232. The housing can be configured to impede or reduce the flow of the fluid through the translation device, thereby allowing the enclosed components to remain at a lower temperature with less exposure to caustic environmental conditions. In turn, this reduces thermal damage to the components and/or reduces the build up of residue left on the translation device by the fluid (e.g. such as exhaust gas products). This housing may be composed of a metal such as stainless steel. Other material with similar heat resistant and non-corrosive properties may be used as well. Insulation (not shown) may also be enclosed by the housing to reduce heat transfer from the fluid to the translation device. In another embodiment (not shown) other configurations if the translation device can be used including additional gearing. Further still, in some examples, it should be appreciated that translation device 236 can include other configurations that do not include gears or include other gear configurations, while providing the same functionality as described above.

FIG. 2b shows the pressure balance swing valve in an open position from the side. In this position reduced forces are acting on both the upper and lower valve plates because the upper and lower valve plates are in alignment with the streamlines of a gas flow 234. However, when the pressure balance swing valve is in the closed position and an open mode is initiated (e.g. by controller 48), the forces acting on the plates by the fluid flow (e.g. airflow) may begin to increase as the valve plates are rotated away from their respective stopper frames by a mechanical input (e.g. via an actuator or motor) provided to driver gear 218. The pressure balance swing valve translates the forces exerted on the upper and lower valve plates into opposing forces, thereby allowing the actuator to apply a lower actuation force than would otherwise be necessary to open and close the valve. When the pressure balance swing valve is in the open position and a close command is initiated by the controller, the driver gear can apply a counterclockwise force (e.g. with reference to FIGS. 1a and 1b) to overcome the forces 228 and 230 until both the upper valve plate and the lower valve plate are in direct contact with the stoppers.

In this example, an opened and a closed mode are discussed. In the closed mode a first rotation direction may be provided (e.g. counterclockwise actuation force) until the valve plates are seated against their respective stopper frames. In the opened mode a clockwise actuation force may be applied by the controller until the valve plates are aligned substantially parallel to the direction of fluid flow. There are many different modes that may be implemented by applying the required actuation force allowing the valve plates to remain in a fixed position that is not perpendicular or parallel to the motion of the fluid (e.g. such as a partially opened position). In this manner, the amount of airflow traveling through the valve can be precisely controlled. Note that an engine controller can be communicatively coupled to an actuator or motor for controlling the rotation of valve 200 as shown in FIG. 1c, for example.

FIG. 2c shows an alternate view along a cross section of passage 290 that is orthogonal to the longitudinal section view of FIGS. 1a and 1b. In the example of FIG. 2c, the pressure balanced swing valve is in a closed position. The lower stopper frame, the upper valve plate, and the lower valve plate are shown, along with actuator 280 communicating with controller 48.

Figure 3:
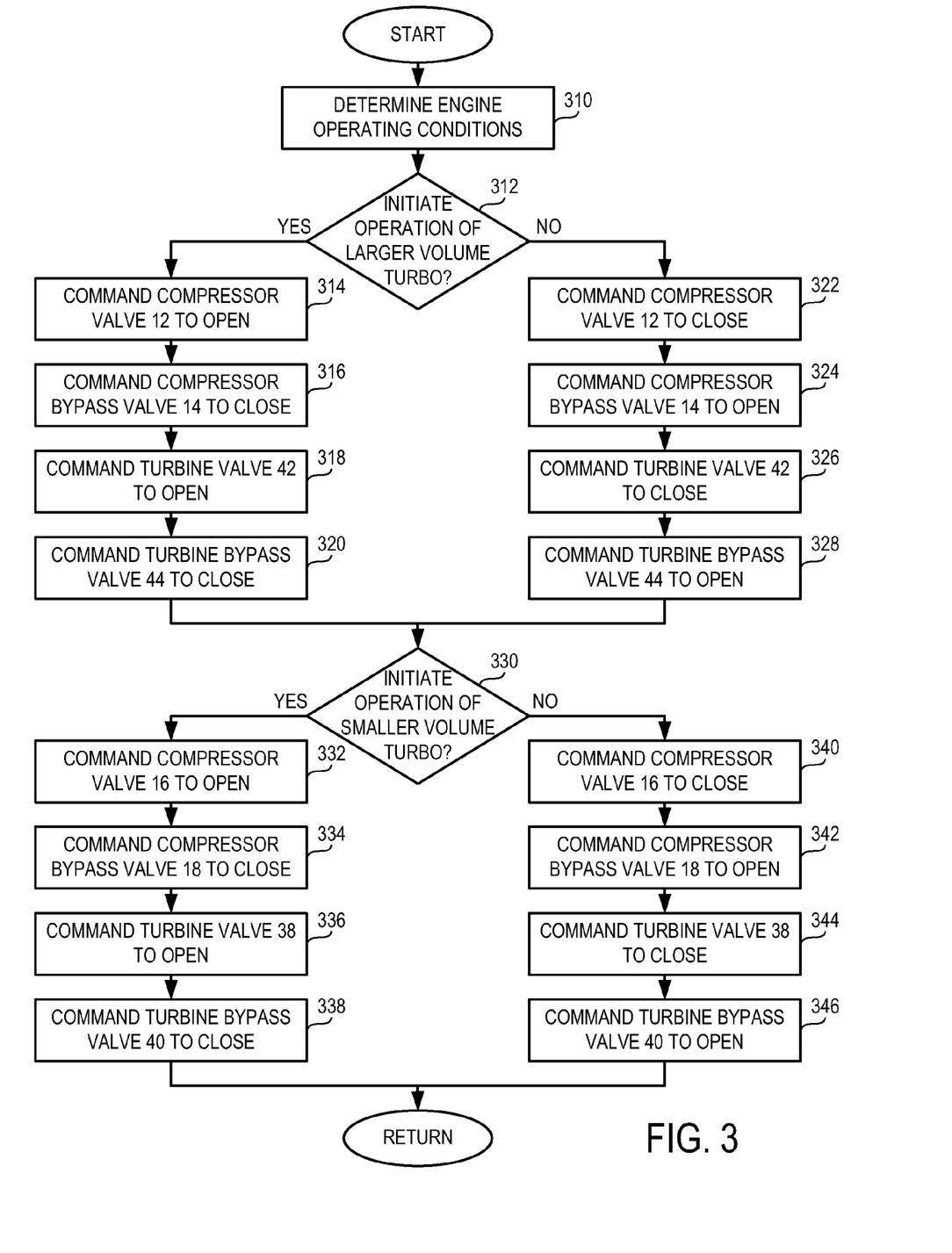
FIG. 3 shows a flow chart depicting an example method for controlling operation of the engine system of FIG. 1.

FIG. 3 shows a flow chart depicting an example method for controlling operation of engine system 50 of FIG. 1. At 310, engine operating conditions may be determined. As one non-limiting example, controller 48 can determine the present operating conditions of the engine system based on signals received from a variety of sensors. For example, controller 48 can identify engine speed via an engine speed sensor communicating with a crankshaft of the engine. Controller 48 can also identify a driver requested engine output based on a signal received from user input device such as an accelerator pedal. Further, controller 48 can receive signals indicative of mass airflow of intake air, intake air temperature, and/or intake air pressure from various regions of the intake and/or exhaust systems of the engine. These and other suitable engine sensors can provide an indication of engine operating conditions to controller 48 as will be appreciated by one of ordinary skill in the art in light of the present disclosure.

In response to the operating conditions determined at 310, it may be judged at 312 whether to initiate operation of the larger volume turbocharger 20. As one example, the controller can determine that operation of the larger volume turbocharger is to be initiated based on engine speed and/or a requested engine output via vehicle operator input. For example, operation of the higher volume turbocharger may be utilized at higher engine speeds and may be discontinued or reduced at lower engine speeds. If the answer at 312 is yes, the controller can issue commands to the appropriate valves to initiate operation of the larger volume turbocharger, as indicated by one or more of the operations of 314-320.

For example, at 314, the controller can command compressor valve 12 to an opened position. At 316, the controller can command compressor bypass valve 14 to a closed position.

At 318, the controller can command turbine valve 42 to an opened position. At 320, the controller can command turbine bypass valve 44 to a closed position. In this way, exhaust gases can be directed through turbine 26 of larger turbocharger 20, thereby increasing the speed at compressor 22, which in turn can provide increased boost to engine 36. Note that in each of the examples provided herein, one or more of valves 12, 14, 42, and 44 can include the pressure balanced swing valve described with reference to FIGS. 2a-2c.

Alternatively, if the answer at 312 is no, the controller can issue commands to the appropriate valves to discontinue operation of the larger volume turbocharger, as indicated by one or more of the operations of 322-328. For example, at 322, the controller can command compressor valve 12 to a closed position. At 316, the controller can command compressor bypass valve 14 to an opened position. At 318, the controller can command turbine valve 42 to a closed position. At 320, the controller can command turbine bypass valve 44 to an opened position. In this way, the amount of exhaust gases that are directed through turbine 26 of larger turbocharger 20 can be reduced or discontinued, thereby reducing the speed at compressor 22, which in turn can reduce the level of boost that is provided to engine 36.

At 330, it may be judged whether to initiate operation of the smaller volume turbocharger 28 based on the operating conditions determined at 310. As one example, operation of the lower volume turbocharger can be initiated at lower engine speeds or for lower engine output requests than compared to the higher volume turbocharger. Thus, operation of the lower volume turbocharger can be initiated and the operation of the higher volume turbocharger can be discontinued as the engine speed and/or engine torque or power outputs are reduced. Conversely, operation of the higher volume turbocharger can be initiated and operation of the lower volume turbocharger can be discontinued as the engine speed and/or engine torque or power outputs are increased. Furthermore, during even lower engine speeds or engine output requests, operation of both the larger and smaller volume turbochargers can be discontinued. Further still, during even higher engine speeds or engine output requests, operation of both the larger and smaller turbochargers can be initiated.

If the answer at 330 is yes, the controller can issue commands to the appropriate valves to initiated operation of the smaller volume turbocharger, as indicated by one or more of the operations of 332-338. At 332, the controller can command compressor valve 16 to an opened position. At 334, the controller can command compressor bypass valve 18 to a closed position. At 336, the controller can command turbine valve 38 to an opened position. At 338, the controller can command turbine bypass valve 40 to a closed position. In this way, exhaust gases can be directed through turbine 34 of smaller turbocharger 28, thereby increasing the speed at compressor 30, which in turn can provide increased boost to engine 36 from turbocharger 28. Note that in each of the examples provided herein, one or more of valves 16, 18, 38, and 40 can include the pressure balanced swing valve described with reference to FIGS. 2a-2c.

Alternatively, if the answer at 330 is no, the controller can issue commands to the appropriate valves to discontinue operation of the smaller volume turbocharger, as indicated by one or more of the operations of 340-346. For example, at 340, the controller can command compressor valve 16 to a closed position. At 342, the controller can command compressor bypass valve 18 to an opened position. At 344, the controller can command turbine valve 38 to a closed position. At 346, the controller can command turbine bypass valve 40 to an opened position. In this way, the amount of exhaust gases that are directed through turbine 34 of smaller turbocharger 28 can be reduced or discontinued, thereby reducing the speed at compressor 30, which in turn can reduce the level of boost that is provided to engine 36.

While an example approach for utilizing the pressure balanced swing valve described herein has been provided in the context of an engine system including two turbochargers arranged in series, it should be appreciated that the pressure balanced swing valve may be used in other engine systems to achieve the same or different advantages, including engine systems having different turbocharger configurations or engine systems that do not include a turbocharger or other boosting device.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   regulating gas flow through a round passage in an engine system via a valve, the valve having a first partially round valve plate and a second partially round valve plate;
   seating the first partially round valve plate onto a first stopper around an entire perimeter of the first partially round valve plate and seating the second partially round valve plate onto a second stopper around an entire perimeter of the second partially round valve plate to close the valve;
   unseating the first partially round valve plate from the first stopper and unseating the second partially round valve plate from the second stopper to open the valve; and
   translating gas flow forces acting on the first partially round valve plate and the second partially round valve plate into opposing and balancing forces during at least valve opening and closing via an internal gear mechanism.

2. The method of claim 1 further comprising, adjusting the first partially round valve plate and the second partially round valve plate to vary operation of a turbocharger of a turbocharged engine system.

3. The method of claim 2, where the gas flow forces are translated via a plurality of gears operatively coupled between the first partially round valve plate and the second partially round valve plate.

4. The method of claim 3, where an area of the first partially round valve plate and an area of the second partially round valve plate are substantially equal.

5. The method of claim 4 wherein the first partially round valve plate and the second partially round valve plate are seated by rotating the first partially round valve plate and the second partially round valve plate in a common rotational direction.

6. The method of claim 5, wherein a flow force on the first partially round valve plate urges the first partially round valve plate closed and a flow force on the second partially round valve plate urges the second partially round valve plate open.

7. The method of claim 6, wherein each of the first partially round valve plate and the second partially round valve plate have a shape of a semi-annular disk.

8. An apparatus configured to regulate flow in a round exhaust passage of an internal combustion engine system, comprising:
a round housing disposed within the round exhaust passage defining a first region and a second region, where the first region includes a first stopper and a first valve plate, where the first stopper completely surrounds the first region, and the first valve plate seats on the first stopper to seal the first region, and where the second region includes a second stopper and a second valve plate, where the second stopper completely surrounds the second region, and the second valve plate seats on the second stopper to seal the second region;
a translating gear mechanism coupled between the first valve plate and the second valve plate, the translating gear mechanism coupling the first valve plate and the second valve plate through a set of gears in the round housing, such that forces acting to close the first valve plate are translated through the translating gear mechanism to act to open the second valve plate, and vice versa; and
an actuator to move the translating gear mechanism, where such movement causes both the first valve plate and the second valve plate to rotate concurrently.

9. The apparatus of claim 8, wherein the translating gear mechanism comprises a plurality of gears.

10. The apparatus of claim 9 wherein the first valve plate and the second valve plate are substantially the same size.

11. The apparatus of claim 10, wherein the translating gear mechanism includes at least three gears, with a first gear coupled to the first valve plate on an axis of the first valve plate, a second gear coupled to the second valve plate on an axis of the second valve plate, and a third gear coupled between the first gear and the second gear, with the actuator coupled to the third gear; and the first gear, second gear, and third gear are in a common plane.

12. The apparatus of claim 10 wherein the translating gear mechanism is enclosed by the round housing such that the translating gear mechanism is separated from a flow of gas through the round housing.

13. The apparatus of claim 12 wherein the first valve plate and the second valve plate are the shape of a semi-annular disk.

14. A system for an engine, comprising:
a turbocharger having a bypass; and
a valve apparatus configured to regulate exhaust gas flow in the bypass, the valve apparatus having a first stopper frame disposed within the bypass and defining a first flow region of the bypass; the valve apparatus having a second stopper frame disposed within the bypass and defining a second flow region of the bypass; the valve apparatus having a valve hub disposed between a portion of the first stopper frame and a portion of the second stopper frame, the valve hub positioned external to the first and second flow regions; the valve apparatus having a valve plate translator disposed within an internal region of the valve hub, a first half-moon shaped valve plate rotateably coupled to the valve plate translator, wherein the first half-moon shaped valve plate is disposed within the bypass upstream of the first stopper frame, a second half-moon shaped valve plate rotateably coupled to the valve plate translator, wherein the second half-moon shaped valve plate is disposed within the bypass downstream of the second stopper frame, and wherein the valve plate translator is configured to translate a first force urging the first half-moon shaped valve plate toward the first stopper frame from a location upstream of the first stopper frame to a second force urging the second half-moon shaped valve plate toward the second stopper frame from a location downstream of the second stopper frame, and where the first half-moon shaped valve plate rotates about a first axis located upstream of a second axis about which the second half-moon shaped valve plate rotates.

15. The system of claim 14 further comprising a second turbocharger of lesser volume than the turbocharger, wherein the second turbocharger includes a compressor arranged downstream from a compressor of the turbocharger.

16. The system of claim 14 wherein the valve apparatus further comprises a valve plate actuator operatively coupled with the valve plate translator, wherein the valve plate actuator is configured to move the first half-moon shaped valve plate relative to the first stopper frame and the second half-moon shaped valve plate relative to the second stopper frame via the valve plate translator.

17. The system of claim 16 wherein the valve plate actuator is configured to move the first half-moon shaped valve plate away from the first stopper frame and the second half-moon shaped valve plate away from the second stopper frame via the valve plate translator.

18. The system of claim 16 wherein the valve plate translator is configured to move the first half-moon shaped valve plate relative to the valve hub responsive to a rotational input from the valve plate actuator; and wherein the valve plate translator is configured to move the second half-moon shaped valve plate by rotating the second half-moon shaped valve plate relative to the valve hub responsive to the rotational input from the valve plate actuator.

19. The system of claim 18, wherein a rotation of the first half-moon shaped valve plate corresponds to a similar rotation of the second half-moon shaped valve plate relative to the valve hub.

* * * * *